May 29, 1956  K. FEDERN  2,748,341
PHOTOELECTRICALLY CONTROLLED GENERATOR
Filed Feb. 26, 1953  2 Sheets-Sheet 1
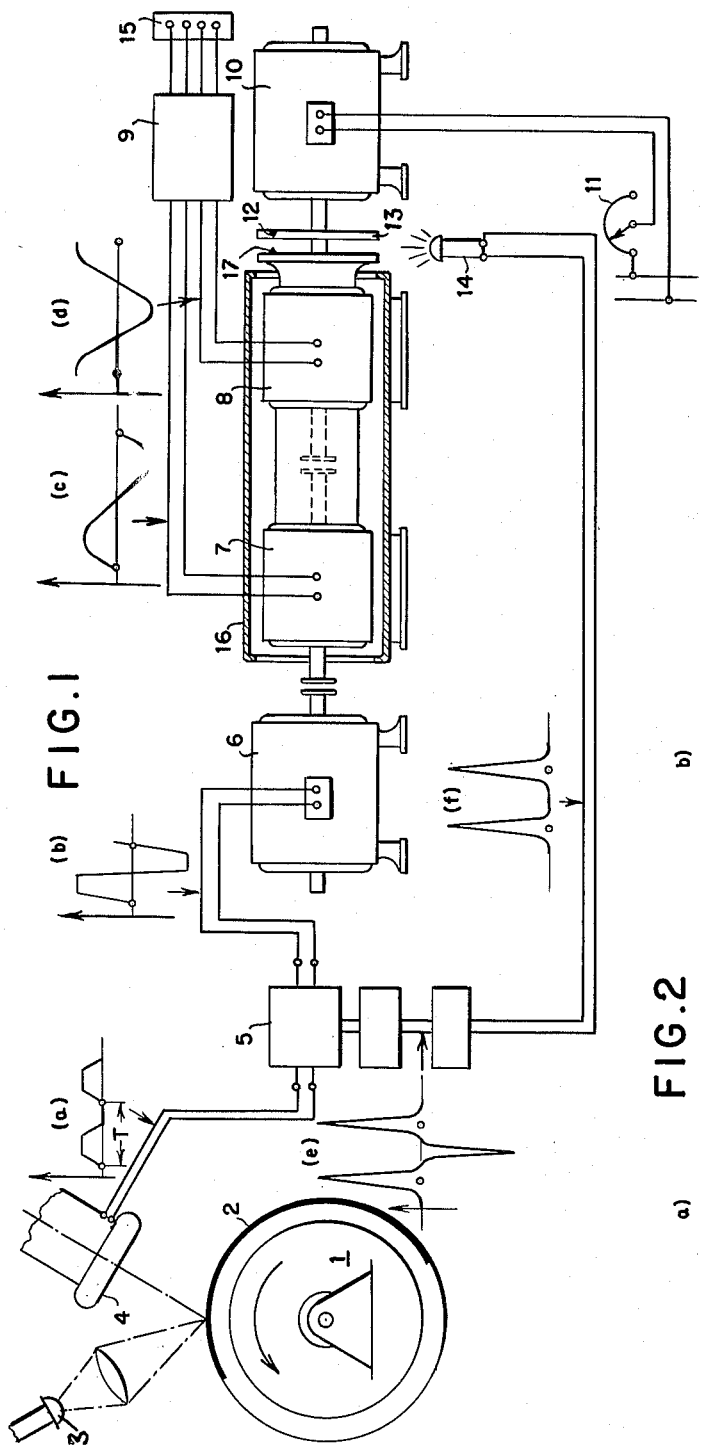
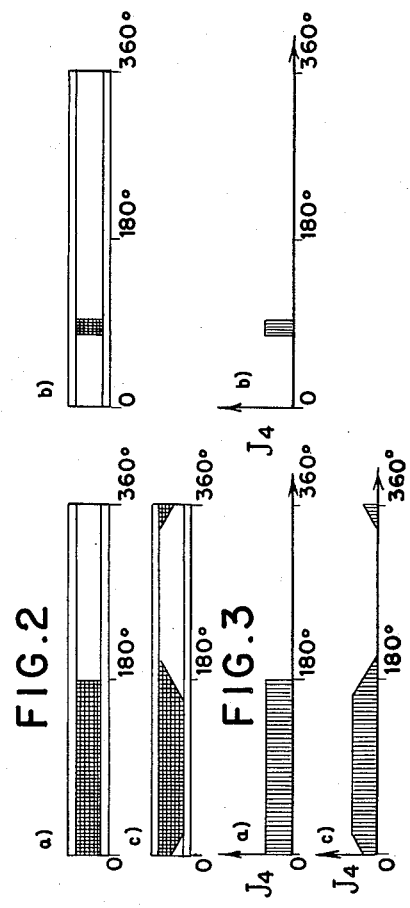

May 29, 1956 K. FEDERN 2,748,341
PHOTOELECTRICALLY CONTROLLED GENERATOR
Filed Feb. 26, 1953 2 Sheets-Sheet 2
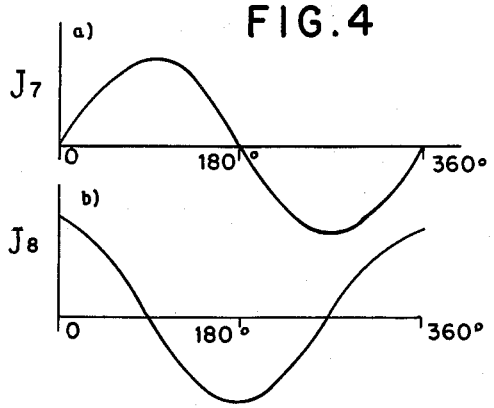
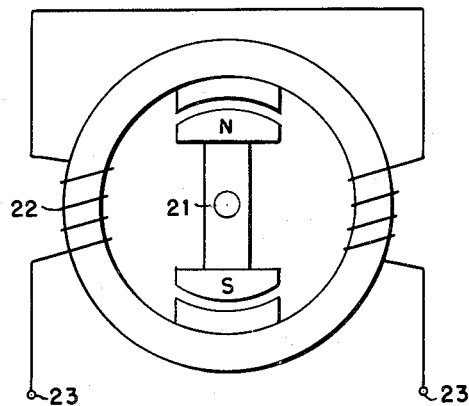
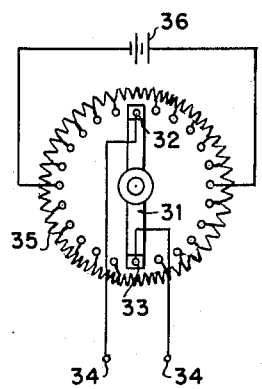
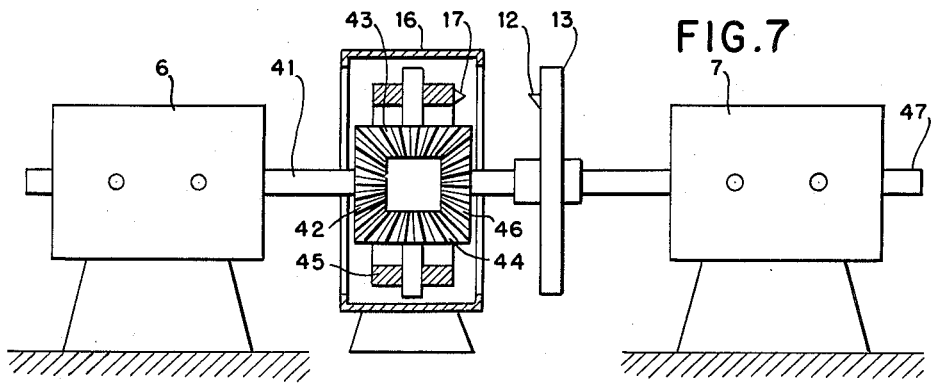

United States Patent Office 2,748,341
Patented May 29, 1956

2,748,341

PHOTOELECTRICALLY CONTROLLED GENERATOR

Klaus Federn, Darmstadt, Germany, assignor to Carl Schenck Maschinenfabrik G. m. b. H., a corporation of Germany Application February 26, 1953, Serial No. 338,984

Claims priority, application Germany March 4, 1952

5 Claims. (Cl. 322—26)

My invention concerns electric apparatus for generating alternating currents of a definite wave shape in synchronism with the cycle of a rotating structure under observation, and is related to my copending application Serial No. 307,837, filed September 4, 1952, and assigned to the assignee of the present invention.

Synchronized currents of the kind just mentioned are required, for instance, for reference purposes in balancing machines, or for analyzing vibrations or measuring other phenomena associated with the revolution of structure. As a rule, a particular and accurate wave shape of the alternating current is necessary or preferable. For instance, when testing a rotor for unbalance on the wattmetric principle, the voltage of a vibration pickup is applied to the voltage coil of a wattmeter and the reference current, passing through the current coil of the same wattmeter, is supposed to have a strictly harmonical wave shape synchronized with the revolution of the structure whose unbalance vibrations are sensed by the pickup. When exacting accuracy requirements are to be met, it is undesirable or infeasible to mechanically couple a sine-wave current generator of the rotary type with the revolving structure under observation, because such a mechanical connection may cause measuring faults due to its reaction upon the revolving structure. Resort must then be had to a photoelectric or similarly reaction-free scanning of the revolving structure to control the means for generating a pure harmonical current.

The production of such harmonic currents by photoelectric scanning has been far from satisfactory for high-accuracy requirements. It has been proposed to distribute over the peripheral surface of the revolving structure a graduated black-and-white arrangement of the markings to be scanned photoelectrically. To accurately apply such an arrangement, a stencil or printing method is preferably employed. If it is desired to selectively or simultaneously produce alternating currents of respectively different phase positions, either two equally subdivided black-and-white distributions must be applied to the periphery of the revolving structure in respective angularly different positions, or the photoelectric pickup device must be duplicated or made angularly displaceable about the axis of revolution.

It is among the objects of my invention to provide a photoelectrically-controlled and hence reaction-free appartus generally of the above-mentioned kind that is capable of producing revolution-synchronized alternating currents of a strictly harmonical or other accurately determined wave shape with the aid of readily phase-adjustable devices of high precision and reliable constancy, and that conveniently affords producing any desired number of selectively or simultaneously available currents.

Another object of my invention is to secure the desired results with the aid of simple electric drive motors and to permit correcting any phase displacement or phase error that may be inherent in the operation of such motors.

According to my invention, I provide a rotatable surface member, to be joined with a revolving body to be tested or forming part thereof, with a ring-shaped and generally black-and-white type marking that is composed only of a single "white" or more-reflective section and a single "black" or less-reflective section so that the photoelectric pickup, scanning the ring-shaped marking area, issues but one current pulse wave for each full revolution, this pulse wave having, for instance, a rectangular or trapezoidal wave shape. I further supply this pickup current, upon amplification, to the control or energizing circuit of a synchronous electric motor and mechanically connect with that motor one or more rotary alternating-current generators to provide the desired alternating currents of the proper wave shape and intensity. According to another feature of my invention, the just-mentioned motor-generator set includes rotatably displaceable adjusting means for varying the angular relation of the generator to the pick-up controlled excitation field of the motor; and I provide the rotatably displaceable adjusting means with a reference mark in juxtaposed relation to a revolvable indicator mark on the structure driven by the synchronous motor, the two marks being illuminated by a stroboscopic light source controlled by the pickup to flash at a fixed phase moment of the revolving black-and-white division.

In such apparatus, the annular single black-and-white subdivision can be applied without appreciable difficulty to a revolvable structure to be investigated and secures the utmost degree of precision since only a single response of the photoelectric pickup during each full revolution is required. Besides, accurately harmonic alternating currents of respectively different phase positions, for instance, a purely sinusoidal current and a purely cosinusoidal current, may be supplied, either simultaneously or alternately or selectively, in any desired phase relation to the revolution under observation, as this phase relation, by virtue of the single black-and-white subdivision in conjunction with the stroboscopic indicator, can be adjusted or changed simply by shifting the generator stators to a given position relative to the rotating stroboscopically-illuminated reference mark.

The foregoing and other objects, advantages and features of my invention will be apparent from the following description in conjunction with the drawings in which—

Fig. 1 shows diagrammatically an apparatus according to the invention equipped with a rotating disc whose peripheral surface has a single black-and-white subdivision;

Figs. 2a, 2b and 2c show three respective embodiments of the black-and-white subdivision by a developed representation of the peripheral disc surface;

Figs. 3a, 3b and 3c are coordinate diagrams representing the photoelectric current pulses obtainable with peripheral zones corresponding to Figs. 2a, 2b and 2c respectively;

Figs. 4a and 4b exemplify by coordinate diagrams the time curves of two harmonic output currents obtainable with apparatus according to Fig. 1;

Figs. 5 and 6 illustrate schematically two respective alternating-current generators applicable in apparatus according to Fig. 1; and Fig. 7 shows a modification of part of the apparatus of Fig. 1.

As illustrated in Fig. 1, a disc-shaped member 1 is mounted for revolution about its axis. This member may consist of a body or structure under observation, for instance, in a balancing machine, or it may consist of a separate structure coaxially joined with the rotor under observation to revolve together therewith. The periphery of the disc member 1 is provided with a black-and-white subdivision 2 whose one half is white or bright (reflective) and whose other half is black or dark (less reflective or non-reflective). The subdivision may be in accordance with the development shown in Fig. 2a.

A lamp, shown at 3 in Fig. 1, throws a beam of light onto the black-and-white zone of disc member 1 so that the light is alternately reflected and not reflected during each rotation of the member. Each reflected beam of light impinges upon a photoelectric cell 4 which issues a current pulse to an amplifier 5. The current pulse is synchronous with the rotation of the member 1 and has a square-top wave, for instance, of rectangular shape as indicated in Fig. 3a. The output terminals of amplifier 5 are connected to a synchronous motor and the amplification is sufficient for driving the motor 6 in synchronism with the rotating member 1. One or several alternating current generators as shown at 7 and 8 are mechanically joined with the shaft of the synchronous motor 6, for instance, by couplings or clutches. The currents generated by generators 7 and 8 have the required particular characteristics, and it will be recognized that these generators are driven as if they were directly and mechanically connected with the rotating member 1. The generator current, if desired, may be passed through an amplifier 9 before serving the desired purpose. The output leads of amplifier 9 are shown connected to a terminal board 15.

A disc 13 firmly mounted on the shaft of the motor-generator set carries an indicator mark 12 illuminated by a stroboscopic flash lamp 14. The generators 7 and 8 have their stator housings firmly connected with each other and revolvably disposed in a stationary guide structure 16 so that the stators are rotationally adjustable about the axis of revolution to permit shifting the phase of the generated alternating currents relative to the revolving cycle of the rotor shaft. The stator housing assembly carries a reference mark 17 opposite mark 12. Lamp 14, which may consist of a neon glow lamp, receives voltage pulses from the amplifier 5 to issue repetitive light flashes in synchronism with the revolution of structure 1. In amplifier 5, the voltage pulses for lamp 14 may be derived by electrical differentiation from the square-top waves of the pickup current, i. e. by producing peaked voltage pulses indicative of the rate of change of the pickup current, and supplying the positive voltage peaks to the inertia-free flash lamp 14 as well known for stroboscopic purposes.

When the generators 7, 8 are driven at the correct speed, the stroboscopically illuminated mark 12 appears to stand still, and the correct phase position of the generated alternating current can then be adjusted by turning the stator assembly in guide structure 16 until the position of mark 17 coincides with that of mark 12 or has a given relation thereto.

This possibility of phase adjustment and correction has the advantage that it permits using a simpler synchronous drive motor 6 than otherwise needed and makes it also possible to compensate for any phase error that may be due to frictional drag especially if generators of the commutator or slide-rheostat-types are used, as will be explained in a later place.

Of particular interest, especially for balance-analyzing purposes, are strictly harmonic shapes of the generated alternating currents such as the currents $J_7$ and $J_8$ shown in Figs. 4a and 4b in dependence upon the rotary position of the rotating member 1. The current $J_7$ is purely sinusoidal while the current $J_8$ has cosine shape.

Various types of rotary alternating current generators are applicable for the purposes of the invention. For instance, the generators may consist of a dynamo-electric machine. As an example, Fig. 5 shows a dynamo whose rotor 21 has a two-pole permanent magnet which, during rotation, induces the alternating current in the generator coils 22 connected to the output terminals of the machine.

However, the alternating-current generators in apparatus according to the invention may also consist of the type in which a brush pair and a commutator revolve one relative to the other, and in which the individual commutator sectors are supplied with respectively different electric potentials graduated by means of resistors or other circuit devices to produce the desired sinusoidal characteristic. An example of such a resistance-commutator type machine is illustrated in Fig. 6. The rotating portion 31 of the machine carries two mutually-insulated brushes 32 and 33 which are connected to the output terminals 34 through slip rings (not shown). The brushes slide over the commutator segments here represented by the tap points of a closed series of resistors 35 which interconnect the segment and are graduated in accordance with the desired shape of the terminal voltage. Two diametrically opposite points of the resistor arrangement are energized from a source 36 of constant direct current. It will be recognized that during the rotation of rotor 31 an alternating voltage is impressed across the output terminals 34.

The operation of the generators involves power losses due to friction. This is especially the case with generators of the resistance-commutator type due to the fact that the brush friction must be overcome. In such cases, it may be desired to relieve the photoelectrically-controlled synchronous motor from the duty of providing the torque required for overcoming this friction. To this end, and as shown in Fig. 1, the illustrated motor-generator set may be optionally equipped with an auxiliary motor 10. The motor 10 should provide a torque which, as much as feasible, is independent of the speed of revolution and which corresponds to the average torque requirements of the alternating-current generators. Then the motor 6 is called upon only to synchronize the revolution of the set and may be given a smaller power rating, and the shape of its poles may be more readily designed for securing the best obtainable accuracy of synchronism.

The auxiliary motor 10 may consist of a universal-type motor and may be energized through a starting or regulating rheostat 11 from a power supply line. The auxiliary motor may be used for starting the entire set so that the synchronous motor 6 need not be equipped with starting facilities. Since in the just-mentioned apparatus the synchronous motor 6 functions essentially in a regulating or correcting sense, a black-and-white subdivision as shown in Fig. 2b is sometimes preferable. According to this subdivision, one of the two surface sections is greatly preponderant over the other in peripheral length so that the resulting photoelectric current pulse is essentially short pip as apparent from Fig. 2b.

It is an advantage of the invention that the above-described addition of the auxiliary motor 10 is generally not required and may be limited to only exceptional requirements. The omission of motor 10 is made possible by the described adjustability of the generator stators in combination with the stroboscopic devices which permit giving the motor 6 any desired power rating and compensating any phase error due to frictional or other causes simply by setting the generator stators at the beginning of each particular operation. This results in a considerable simplification of the entire motor-generator set.

For the same reason, the invention permits using a single drive motor of simplest design, such as an induction motor of the type known as hysteresis motor. Motors of this type are self-starting but, when started, do not have a definite phase position relative to the energizing current despite the coincident frequency. However, it is only necessary after each starting to shift the stator position of the generators for giving the generated alternating currents the correct phase position relative to the revolution of the body 1.

In cases where the auxiliary motor 10 is added, the above-described stroboscopic devices may also be used to advantage for properly adjusting or regulating the torque of this motor. When the torque supplied by motor 10 is correct, the mark 12 appears to be at rest. When this torque is too small, the remaining torque must be furnished by the synchronous motor 6 so that its rotor may lag relative to its rotating field. As a result, the mark 12 also seems to be lagging; and it is then necessary to adjust the rheostat 11 until mark 12 comes to rest. If the torque of the auxiliary motor 10 is too large, the synchronous motor 6 must exert a braking moment. Its rotor then tends to lead the field so that the mark 12 appears to advance relative to mark 17; and the rheostat 11 must then be set to a point at which mark 12 stands still. After each such adjustment, the marks 12 and 17 are placed in registry by turning the generator housing relative to the fixed guide structure 16 to thus establish the correct phase adjustment of the generated alternating currents.

While in the foregoing reference is made to the rotational adjustability of the generator stators, it should be understood that the above-described phase correction can also be obtained with the aid of equivalent mechanical phase shift means. For instance, the stator of the generator may be kept stationary while instead the stator of the drive motor is made rotationally adjustable. Another possibility is to keep all stators fixed and to provide for rotational adjustment between the motor shaft and the generator shaft. An embodiment of the last-mentioned type is illustrated in Fig. 7.

Fig. 7 shows an apparatus with only one drive motor 6 and only one alternating current generator 7. The circuit connections (not shown in Fig. 7) are identical with those of motors 6 and 7 in Fig. 1. According to Fig. 7, the shaft 41 of motor 6 carries a bevel gear 42 which meshes with two coaxial bevel gears 43 and 44 of a differential gearing. Gears 43 and 44 are journalled in a normally stationary but rotationally adjustable ring or housing 45 which carries a reference mark 17 corresponding to the reference mark 17 in Fig. 1. The output gear 46 of the differential gearing is mounted on the shaft 47 of generator 7. Shaft 47 also carries a disc 13 with an indicator mark 12 corresponding to items 13 and 12 in Fig. 1. The phase position of shaft 47 and hence the phase of the alternating current produced by generator 7 can be adjusted relative to the revolving cycle of motor shaft 41 by turning the ring 45 of the differential gearing about the shaft axis. In all other respects, the operation of the apparatus is as described in the foregoing with reference to Fig. 1.

It will be understood by those skilled in the art upon a study of this disclosure that apparatus according to my invention may be modified as to various details and may be embodied in apparatus other than specifically illustrated and described, without departing from the essential features of my invention and within the scope of the claims annexed hereto.

I claim:

1. Electric apparatus for producing alternating current in synchronism with a rotating body, comprising a rotatable surface member with an annular surface zone having two zone sections of optically different reflectivity, a photoelectric pickup responsive to radiation reflected from said zone to produce a current pulse during each full rotation of said member, an amplifier connected to said pickup, a motor-generator set having a drive motor connected to said amplifier to revolve in synchronism with said pulses, said set having an alternating-current generator for providing a current wave in synchronism with said pulses, an indicator mark on said set to revolve together therewith, phase-shift means connected with said set and having a structure rotationally adjustable about the axis of revolution of said set for phase displacing said generator current wave relative to said pulses, a reference mark disposed on said structure in relation to the revolving path of said indicator mark, a stroboscopic light source for illuminating said two marks, and circuit means connecting said light source with said pickup for flashing said light source in synchronism with said pulses.

2. Electric apparatus for producing alternating current in synchronism with a rotating body, comprising a rotatable surface member with an annular surface zone having two zone sections of optically different reflectively, a photoelectric pickup responsive to radiation reflected from said zone to produce a current pulse during each full rotation of said member, an amplifier connected to said pickup, a motor-generator set having a motor unit connected to said amplifier to revolve in synchronism with said pulses, said set having an alternating-current generating unit for providing an alternating-current wave in synchronism with said pulses, one of said units having a structure revolving together with said motor unit and having an indicator mark revolvable together with said structure, and one of said units having a stator rotationally adjustable about the axis of revolution of said set for phase displacing said alternating-current wave relative to said pulses, a reference mark rotationally adjustable together with said stator and disposed adjacent to the path of revolution of said indicator mark, a stroboscopic light source for illuminating said two marks, and circuit means connecting said light source with said pickup for flashing said light source in synchronism with said pulses.

3. Electric apparatus for producing alternating current in synchronism with a rotating body, comprising a rotatable surface member with an annular surface zone having two zone sections of optically different reflectivity, a photoelectric pickup responsive to radiation reflected from said zone to produce a current pulse during each full rotation of said member, a motor connected to said amplifier and having a shaft to revolve in synchronism with said pulses, an alternating-current generator having a rotor connected with said shaft to be driven thereby for producing a current wave in synchronism with said pulses, an indicator mark in fixed relation to said shaft to revolve together therewith, said generator having a stator rotationally adjustable about said rotor for phase displacing said current wave relative to said pulses, a reference mark rotationally adjustable together with said stator and disposed adjacent to the path of revolution of said indicator mark, a stroboscopic light source for illuminating said two marks, and circuit means connecting said light source with said pickup for flashing said light source in synchronism with said pulses.

4. In apparatus according to claim 1, said motor being an induction motor of the hysteresis type.

5. Electric apparatus for producing alternating current in synchronism with a rotation body, comprising a rotatable surface member with an annular surface zone having two zone sections of optically different reflectivity, a photoelectric pickup responsive to radiation reflected from said zone to produce a current pulse during each full rotation of said member, an amplifier connected to said pickup, a motor-generator set having a drive motor connected to said amplifier to revolve in synchronism with said pulses, said set having an alternating-current generator for providing a current wave in synchronism with said pulses, an indicator mark on said set to revolve together therewith, phase-shift means connected with said set and having a structure rotationally adjustable about the axis of revolution of said set for phase displacing said generator current wave relative to said pulses, a reference mark disposed on said structure in relation to the revolving path of said indicator mark, a stroboscopic light source disposed for illuminating said two marks and connected with said amplifier for receiving therefrom voltage pulses synchronous with said current pulses.

References Cited in the file of this patent

UNITED STATES PATENTS 1,618,757    Hoxie _____ Feb. 22, 1927